United States Patent
Baker et al.

(10) Patent No.: US 6,170,894 B1
(45) Date of Patent: Jan. 9, 2001

(54) GLASS PANE LIFTER APPARATUS

(76) Inventors: Rhonda Baker, 20319 Union St., Wildomar, CA (US) 92595; Carl Spelic, 6916 Peabody St., Long Beach, CA (US) 90808

(*) Notice: Under 35 U.S.C. 154(b), the term of this patent shall be extended for 0 days.

(21) Appl. No.: 09/329,376

(22) Filed: Jun. 10, 1999

(51) Int. Cl.[7] .................................. B25F 1/00; B25G 1/08
(52) U.S. Cl. .................................. 294/64.1; 294/2; 7/151; 7/167; 16/111.1
(58) Field of Search .............................. 294/1.1, 2, 64.1, 294/64.2, 64.3; 7/151, 167; 206/229, 582, 829; 15/105; 16/111.1

(56) References Cited

U.S. PATENT DOCUMENTS

| | | |
|---|---|---|
| 2,127,154 | 8/1938 | Buik . |
| 2,209,424 | 7/1940 | Shipman et al. . |
| 2,243,106 * | 5/1941 | Limbert ............................... 294/64.1 |
| 2,287,576 | 6/1942 | Solomon . |
| 3,424,486 * | 1/1969 | Corley ............................... 294/64.1 |
| 3,913,964 | 10/1975 | Lukeman . |
| 4,901,606 * | 2/1990 | Christensen ........................ 294/64.1 |
| 5,106,139 * | 4/1992 | Palmer et al. ..................... 294/64.1 |
| 5,306,059 * | 4/1994 | Pirrallo ............................. 294/64.1 |
| 5,375,895 | 12/1994 | Volkert . |
| 5,589,018 * | 12/1996 | Campfield ......................... 206/582 |

* cited by examiner

Primary Examiner—Dean J. Kramer

(57) ABSTRACT

In one embodiment, a glass pane lifter apparatus includes a hollow handle which includes an access opening, an elbow member that includes a first elbow end that connects to the access opening of the hollow handle, and a suction cup unit that is connected to the elbow member. The suction cup includes a suction release tab. The elbow member is a right-angled elbow. The hollow handle includes a finger reception contoured region. A chisel member is connected to the hollow handle. The chisel member projects from the hollow handle at an end of the hollow handle opposite to the access opening. A container of lubricant retainable inside the hollow handle. In addition, a glass cutter is retainable inside the hollow handle. The glass pane lifter apparatus and the contained glass cutter and/or container of lubricant provide a kit for maintenance of fire extinguishers retained in fire extinguisher enclosures that include glass panes. In another embodiment, the hollow handle and the elbow member are combined in a unitary handle/elbow unit. The access opening is located on the handle/elbow unit at an end opposite to the suction cup unit. A chisel member and a belt clip assembly are connected to the handle/elbow unit by means of a cap member screwed onto the handle/elbow unit for covering the access opening. An absorbent pad assembly is attached to the handle/elbow unit at an end opposite to the access opening.

22 Claims, 6 Drawing Sheets

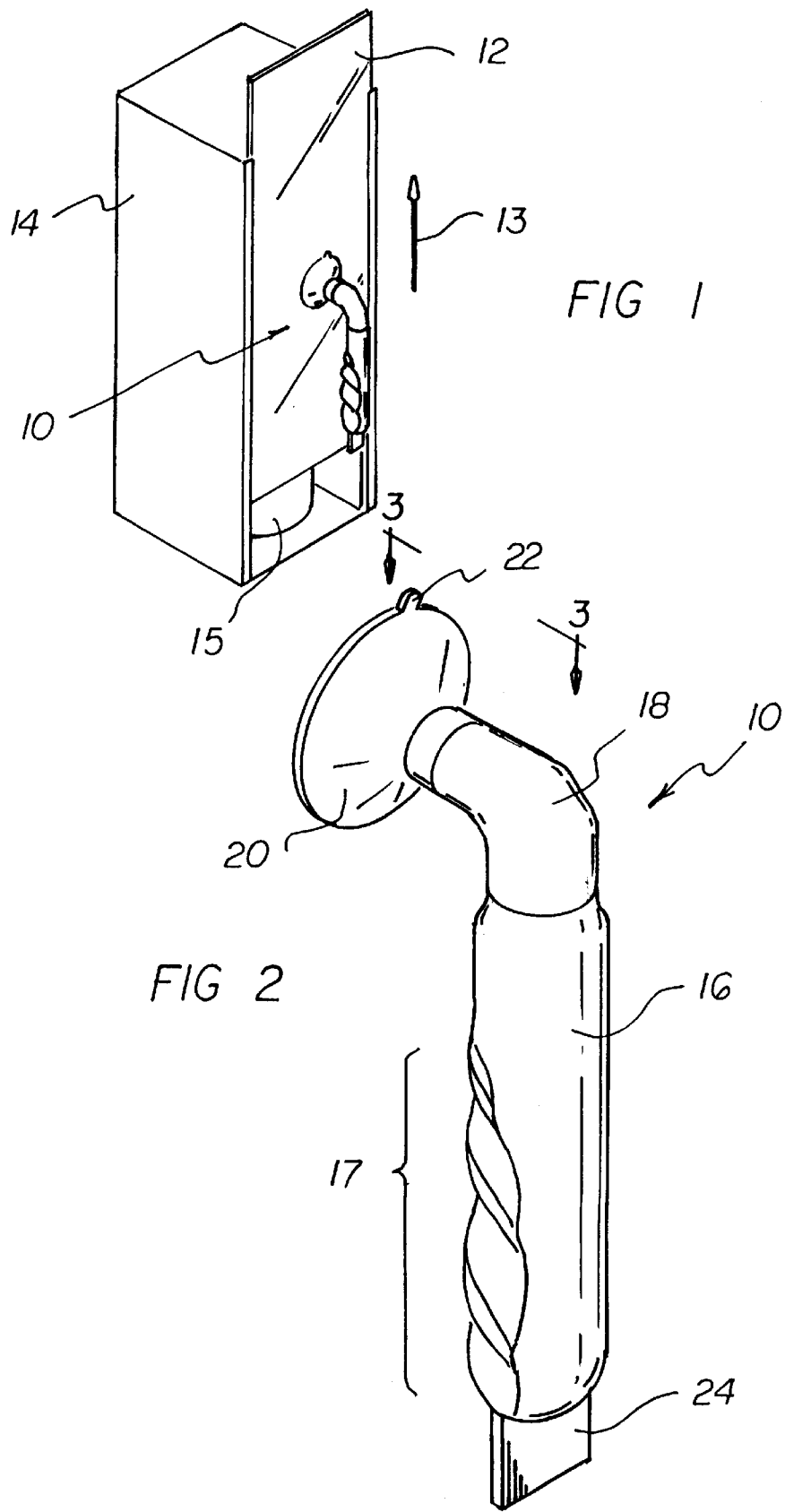

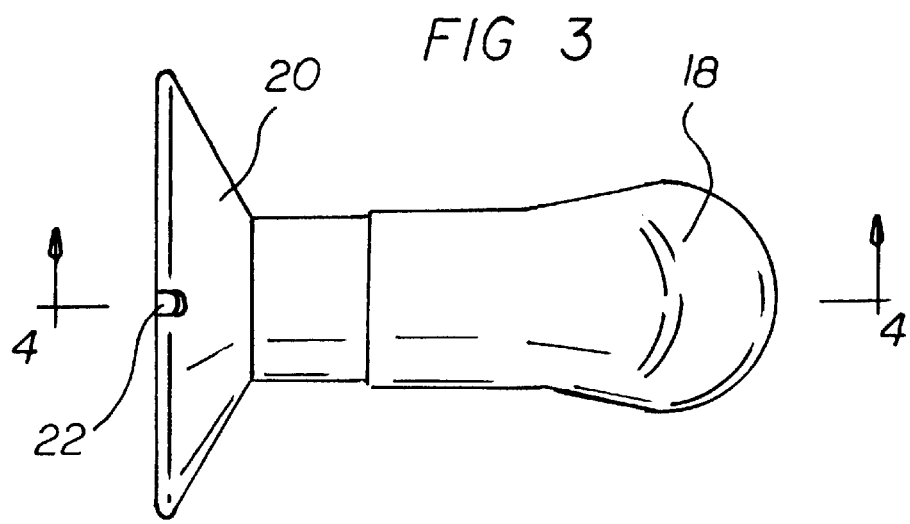
FIG 3
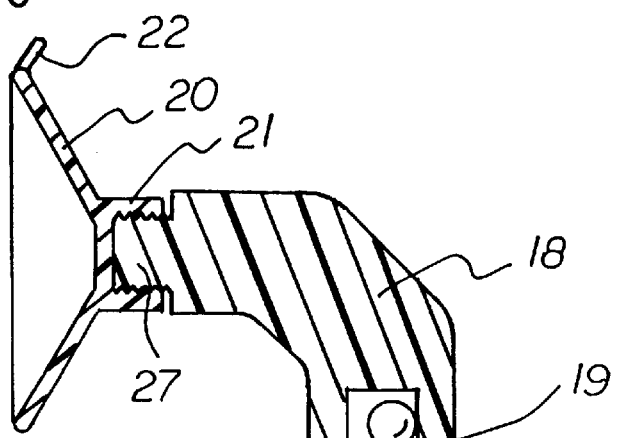
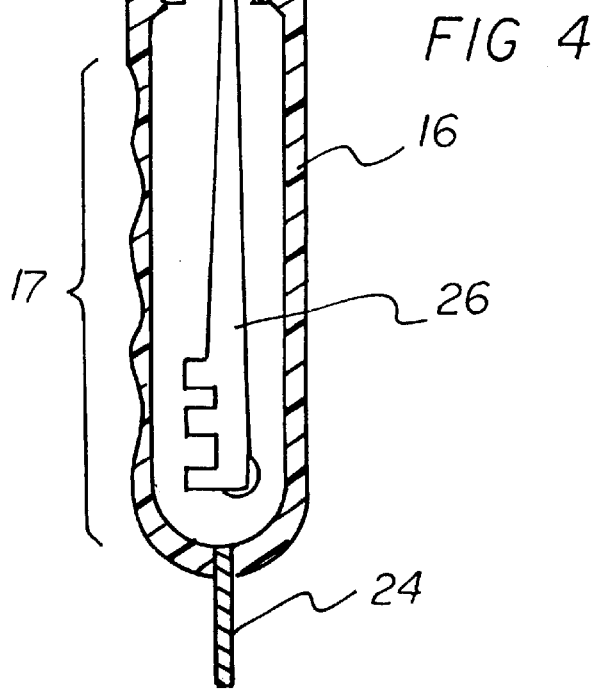
FIG 4

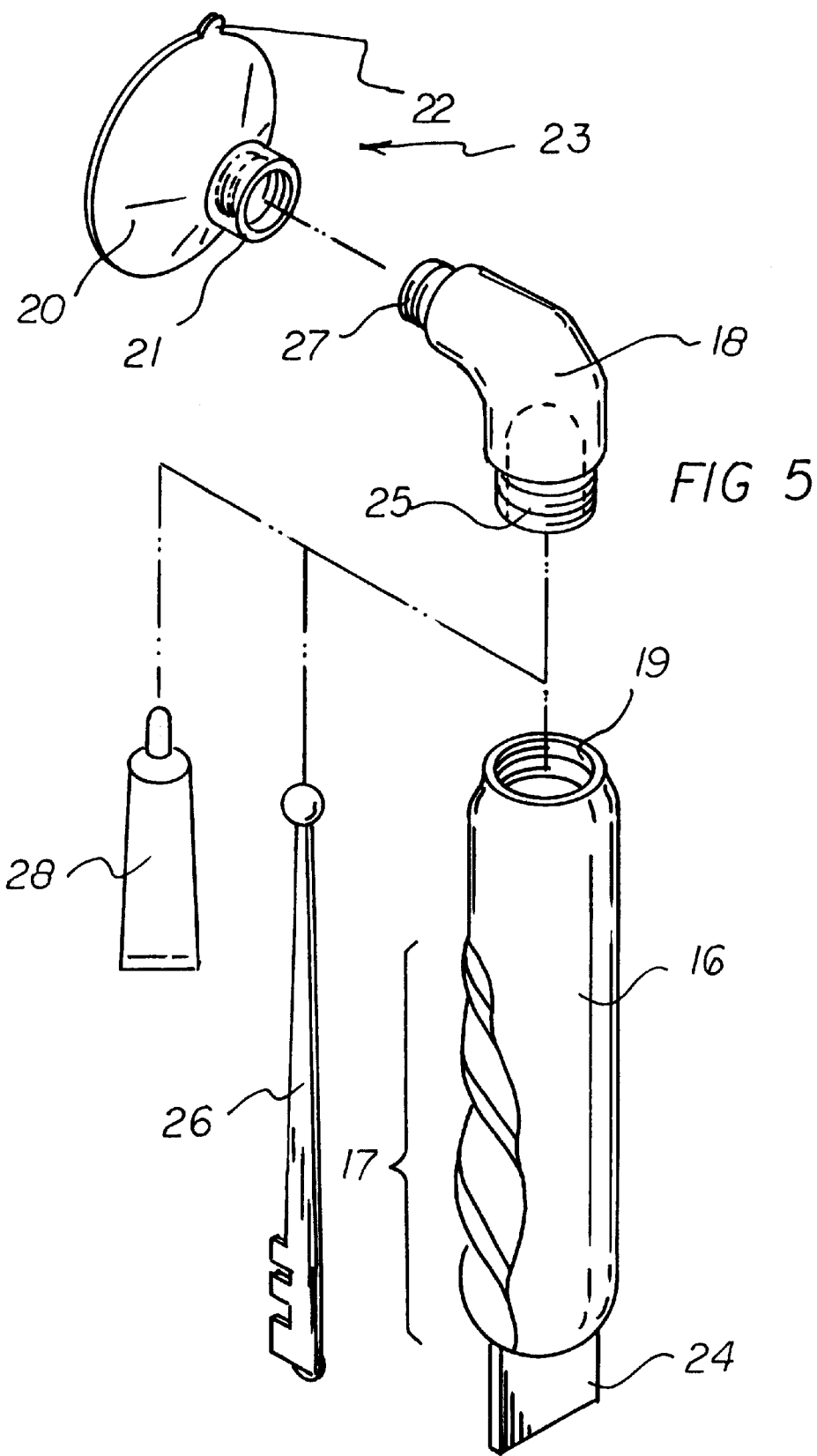

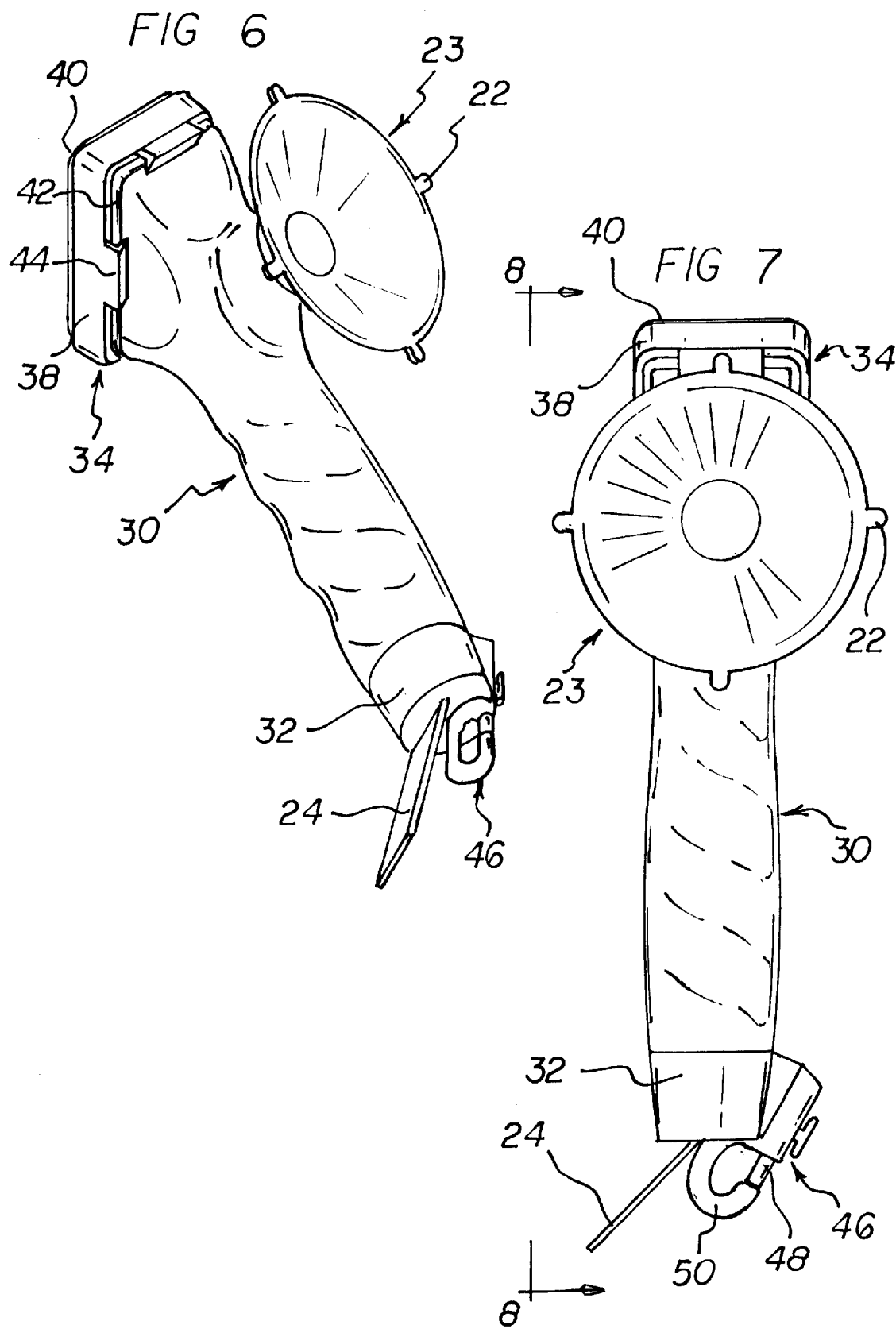

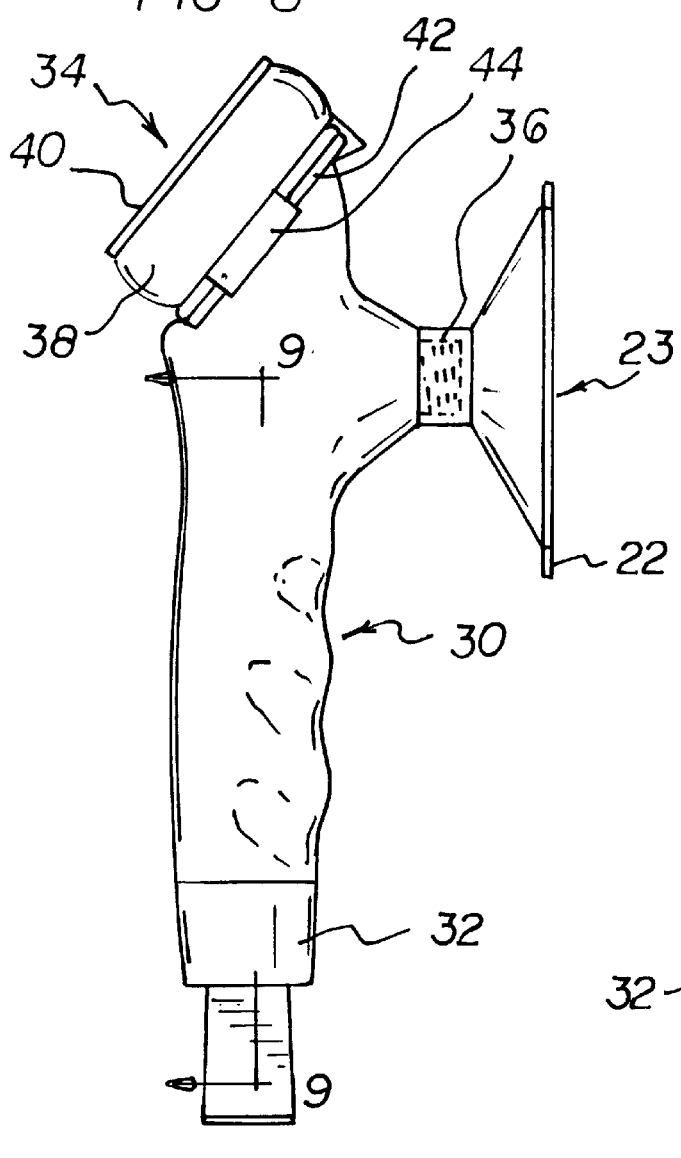
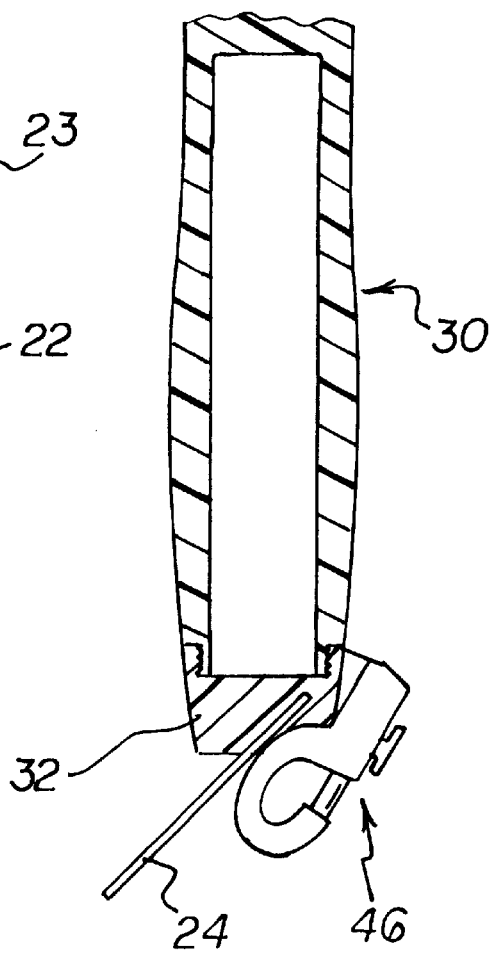

GLASS PANE LIFTER APPARATUS

BACKGROUND OF THE INVENTION

1. Field of the Invention

The present invention relates generally to devices for lifting and moving glass panes and, more particularly, to hand-held devices which have suction cups for engaging the glass panes.

2. Description of the Prior Art

Lifting and moving glass panes are important operations in a wide variety of work environments. Glass panes are particularly susceptible to breakage, and the devices used to lift and move the glass panes must be designed to handle the glass panes gently. For many years it had been known that suction cups are especially useful for engaging glass panes in a gentle manner. In this respect, throughout the years, a number of innovations have been developed relating to devices which employ suction cups for lifting and moving glass panes, and the following U.S. patents are representative of some of those innovations: U.S. Pat. Nos. 2,127,154, 2,209,424, 2,287,576, 3,913,964, and 5,375,895. More specifically, U.S. Pat. No. 2,127,154 discloses a hand-held implement that employs a pair of suction cups for engaging glass panes. The handle is hollow and partially includes springs connected to the suction cups. However, no means are provided for gaining access to the hollow handle to use the hollow interior as a storage area for articles to be stored. In this respect, it would be desirable if a hand-held implement having a suction cup were provided that had means for gaining access to a hollow handle for storing articles in the hollow handle.

Each of U.S. Pat. Nos. 2,209,424, 2,287,576, 3,913,964, and 5,375,895 have a common characteristic in not providing a hollow handle for a hand-held implement having a suction cup for handling glass panes. Moreover, each of U.S. Pat. Nos. 2,209,424 and 2,287,576 discloses a relatively complex mechanical mechanism for releasing suction from the suction cups. For purposes of simplicity and economy, it would be desirable if a hand-held implement containing a suction cup were provided which employs a very simple device for releasing suction from the suction cup.

Still other features would be desirable in a hand-held glass pane lifter apparatus. For example, in the service of maintaining fire extinguishers, a fire extinguisher is often retained in a cabinet that has a glass pane blocking normal access to the fire extinguisher. The glass pane is often retained in position with a padlock. In emergency conditions, to access the fire extinguisher, the glass pane is broken. However, to perform routine maintenance on the fire extinguisher, the lock must first be unlocked so that the glass pane can be slid upward to access the fire extinguisher. Sometimes the locks need lubrication before they operate properly. In this respect, it would be desirable if a hand-held glass pane lifter were provided with a handle that stored a container of lock lubricant.

When a glass pane protecting a fire extinguisher is broken, it must be replaced. To do so, the technician often must custom cut a piece of glass to replace the broken glass pane. In this respect, it would be desirable if a hand-held glass pane lifter were provided with a handle that stored a glass cutter.

Moreover, with the handle of a hand-held glass pane lifter containing a container of lock lubricant and/or a glass cutter, a kit would be provided for accessing fire extinguishers housed in enclosures that employed glass panes locked in position with padlocks.

Thus, while the foregoing body of prior art indicates it to be well known to use hand-held implements that employ suction cups for lifting and moving glass panes, the prior art described above does not teach or suggest a glass pane lifter apparatus which has the following combination of desirable features: (1) provides a hand-held implement which has a suction cup and which has means for gaining access to a hollow handle for storing articles in the hollow handle; (2) employs a very simple device for releasing suction from the suction cup; (3) has a handle that stores a container of lock lubricant; (4) has a handle that stores a glass cutter; and (5) provides a kit for accessing fire extinguishers housed in enclosures that employ glass panes locked in position with padlocks. The foregoing desired characteristics are provided by the unique glass pane lifter apparatus of the present invention as will be made apparent from the following description thereof Other advantages of the present invention over the prior art also will be rendered evident.

SUMMARY OF THE INVENTION

To achieve the foregoing and other advantages, the present invention, briefly described, provides a glass pane lifter apparatus which includes a hollow handle which includes an access opening. An elbow member includes a first elbow end that connects to the access opening of the hollow handle, and a suction cup unit is connected to the elbow member. The access opening includes internal threads, and the first elbow end includes external threads complimentary to the internal threads of the access opening. The elbow member includes a second elbow end, and the suction cup unit includes an elbow connector connected to the second elbow end. A suction cup is connected to the elbow connector. The second elbow end includes external threads, and the elbow connector includes internal threads complimentary to the external threads of the second elbow end. The suction cup includes a suction release tab.

The elbow member is a right-angled elbow. The hollow handle includes a finger reception contoured region. A chisel member is connected to the hollow handle. The chisel member projects from the hollow handle at an end of the hollow handle opposite to the access opening. A container of lubricant is retainable inside the hollow handle. In addition, a glass cutter is retainable inside the hollow handle.

In accordance with another embodiment of the invention, the hollow handle and the elbow member are combined in a unitary handle/elbow unit. The access opening is located on the handle/elbow unit at an end opposite to the suction cup unit. A chisel member is connected to the handle/elbow unit. The chisel member projects from the handle/elbow unit in close proximity to the access opening. The chisel member is attached to a cap member which is screwed onto the handle/elbow unit for covering the access opening. The suction cup unit is connected to the handle/elbow unit at a threaded connection on the handle/elbow unit.

An absorbent pad assembly is attached to the handle/elbow unit at an end opposite to the access opening. The absorbent pad assembly includes a pad holder portion which is connected to the handle/elbow unit, and a pad is retained by the pad holder portion. The handle/elbow unit includes a clip-engagement flange, and the pad holder portion includes retention clips for engaging the clip-engagement flange.

In addition, a belt clip assembly is attached to the cap member. The belt clip assembly includes a manually slidable latch and a latch retention member for receiving the manually slidable latch. The manually slidable latch operates by a spring-loaded snap action on the latch retention member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved glass pane lifter apparatus which has all of the advantages of the prior art and none of the disadvantages.

It is another object of the present invention to provide a new and improved glass pane lifter apparatus which may be easily and efficiently manufactured and marketed.

It is a further object of the present invention to provide a new and improved glass pane lifter apparatus which is of durable and reliable construction.

An even further object of the present invention is to provide a new and improved glass pane lifter apparatus which is susceptible of a low cost of manufacture with regard to both materials and labor, and which accordingly is then susceptible of low prices of sale to the consuming public, thereby making such glass pane lifter apparatus available to the buying public.

Still yet a further object of the present invention is to provide a new and improved glass pane lifter apparatus which provides a hand-held implement which has a suction cup and which has means for gaining access to a hollow handle for storing articles in the hollow handle.

Still another object of the present invention is to provide a new and improved glass pane lifter apparatus that employs a very simple device for releasing suction from the suction cup.

Yet another object of the present invention is to provide a new and improved glass pane lifter apparatus which has a handle that stores a container of lock lubricant.

Even another object of the present invention is to provide a new and improved glass pane lifter apparatus that has a handle that stores a glass cutter.

Still a further object of the present invention is to provide a new and improved glass pane lifter apparatus which provides a kit for accessing fire extinguishers housed in enclosures that employ glass panes locked in position with padlocks.

These together with still other objects of the invention, along with the various features of novelty which character- ize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereo. Such description makes reference to the annexed drawing wherein:

FIG. 1 is a perspective view showing a first embodiment of the glass pane lifter apparatus of the invention in use lifting a glass pane on an enclosure which houses a fire extinguisher.

FIG. 2 is an enlarged perspective view of the embodiment of the glass pane lifter apparatus shown in FIG. 1, removed from the fire extinguisher enclosure.

FIG. 3 is a top view of the embodiment of the glass pane lifter apparatus of FIG. 2 taken along line 3—3 thereof.

FIG. 4 is a cross-sectional view of the embodiment of the invention shown in FIG. 3 taken along line 4—4 thereof.

FIG. 5 is an exploded perspective view of the embodiment of the invention shown in FIGS. 1–4.

FIG. 6 is a perspective view of a second embodiment of the invention.

FIG. 7 is a front view of the embodiment of the invention shown in FIG. 6.

FIG. 8 side view of the embodiment of the invention shown in FIG. 7 taken along line 8—8 thereof.

FIG. 9 is cross-sectional view of the embodiment of the invention shown in FIG. 8 taken along line 9—9 thereof.

DESCRIPTION OF THE PREFERRED EMBODIMENT

Figure 10:
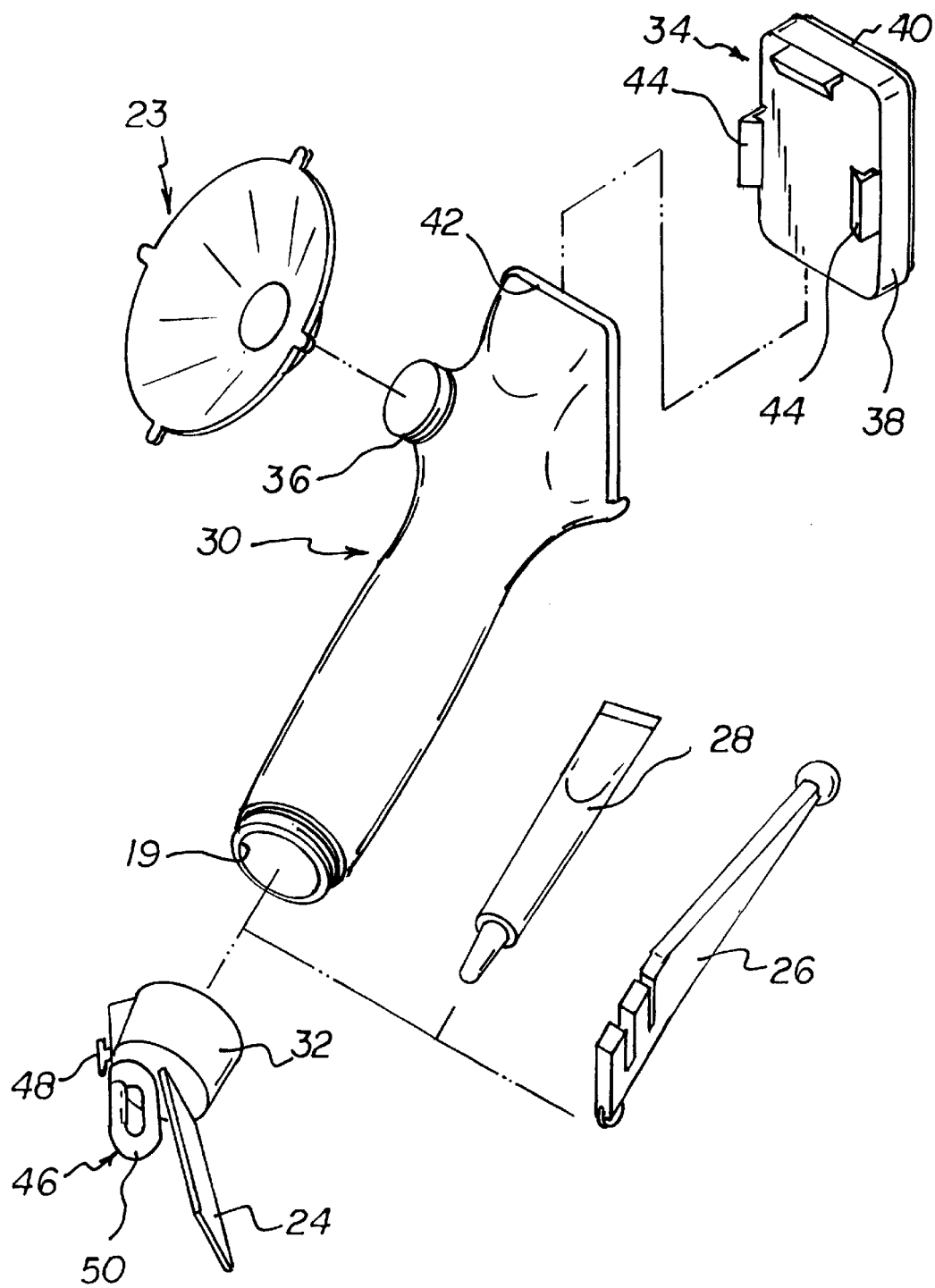
FIG. 10 is an exploded perspective view of the embodiment of the invention shown in FIGS. 6 through 9.

With reference to the drawings, a new and improved glass pane lifter apparatus embodying the principles and concepts of the present invention will be described.

Turning to FIGS. 1–5, there is shown a first embodiment of the glass pane lifter apparatus of the invention generally designated by reference numeral 10. In its preferred form, glass pane lifter apparatus 10 includes a hollow handle 16 which includes an access opening 19, an elbow member 18 that includes a first elbow end 25 that connects to the access opening 19 of the hollow handle 16, and a suction cup unit 23 that is connected to the elbow member 18. The access opening 19 includes internal threads, and the first elbow end 25 includes external threads complimentary to the internal threads of the access opening 19. The elbow member 18 includes a second elbow end 27, and the suction cup unit 23 includes an elbow connector 21 connected to the second elbow end 27. A suction cup 20 is connected to the elbow connector 21. The second elbow end 27 includes external threads, and the elbow connector 21 includes internal threads complimentary to the external threads of the second elbow end 27. The suction cup 20 includes a suction release tab 22.

The elbow member 18 is a right-angled elbow. The hollow handle 16 includes a finger reception contoured region 17. A chisel member 24 is connected to the hollow handle 16. The chisel member 24 projects from the hollow handle 16 at an end of the hollow handle 16 opposite to the access opening 19. A container of lubricant 28 retainable inside the hollow handle 16. In addition, a glass cutter 26 is retainable inside the hollow handle 16.

To place the glass cutter 26 and/or the container of lubricant 28 inside the hollow handle 16, the elbow member 18 is unscrewed from the access opening 19. Then, the glass cutter 26 and/or the container of lubricant 28 can be placed inside the hollow handle 16. Similarly, to remove articles from inside the hollow handle 16, the elbow member 18 is unscrewed from the access opening 19.

To use the glass pane lifter apparatus 10 for lifting a glass pane 12 shown in FIG. 1, the hollow handle 16 is grasped by a user, and the suction cup 20 is pressed onto the glass pane 12. The user's fingers can comfortably contact the finger reception contoured region 17 of the hollow handle 16. The glass pane 12 is lifted up from the fire extinguisher enclosure 14 by pushing upward on the glass pane 12 in the direction of arrow 13. Lubricant from the container of lubricant 28 can be used to lubricate a padlock, not shown, to release the glass pane 12. In addition, the lubricant can be used to lubricate the surfaces between the glass pane 12 and the fire extinguisher enclosure 14 so that the glass pane 12 slides more easily with respect to the fire extinguisher enclosure 14. Once the glass pane 12 has been lifted and removed from the fire extinguisher enclosure 14, the fire extinguisher 15 can be serviced. If the glass pane 12 needs to be replaced, the glass cutter 26 can be used to prepare a substitute glass pane 12. To release the suction cup 20 from the glass pane 12, the suction release tab 22 is lifted, and air rushes under the suction cup 20 to release suction therefrom. If the suction cup unit 23 has to be replaced, it is simply unscrewed from the elbow member 18 and replaced with a new suction cup unit 23.

In addition, the chisel member 24 can be used for a number of useful purposes, such as loosened the glass pane 12 with respect to the fire extinguisher enclosure 14. The chisel member 24 of the invention can be used instead of using a separate flat bladed screwdriver. In general, a useful kit is provided for maintenance of fire extinguishers retained in fire extinguisher enclosures. The kit includes the glass pane lifter apparatus 10 and the contained glass cutter 26 and/or container of lubricant 28.

Turning to the embodiment of the invention shown in FIGS. 6 through 10, the hollow handle 16 and the elbow member 18 are combined in a unitary handle/elbow unit 30. The access opening 19 is located on the handle/elbow unit 30 at an end opposite to the suction cup unit 23. A chisel member 24 is connected to the handle/elbow unit 30. The chisel member 24 projects from the handle/elbow unit 30 in close proximity to the access opening 19. The chisel member 24 is attached to a cap member 32 which is screwed onto the handle/elbow unit 30 for covering the access opening 19. The suction cup unit 23 is connected to the handle/elbow unit 30 at a threaded connection 36 on the handle/elbow unit 30.

An absorbent pad assembly 34 is attached to the handle/elbow unit 30 at an end opposite to the access opening 19. The absorbent pad assembly 34 includes a pad holder portion 38 which is connected to the handle/elbow unit 30, and a pad 40 is retained by the pad holder portion 38. The handle/elbow unit 30 includes a clip-engagement flange 42, and the pad holder portion 38 includes retention clips 44 for engaging the clip-engagement flange 42.

In addition, a belt clip assembly 46 is attached to the cap member 32. The belt clip assembly 46 includes a manually slidable latch 48 and a latch retention member 50 for receiving the manually slidable latch 48. The manually slidable latch 48 operates by a spring-loaded snap action on the latch retention member 50.

The absorbent pad assembly 34 is especially useful for wiping moisture off of a glass surface before the suction cup unit 23 is applied to the glass surface. A drier glass surface permits a more effective suction action of the suction cup unit 23. The belt clip assembly 46 is useful for attaching the glass pane lifter apparatus 10 of the invention to a belt or a belt loop worn by a technician.

The components of the glass pane lifter apparatus of the invention can be made from inexpensive and durable metal, rubber, and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved glass pane lifter apparatus that is low in cost, relatively simple in design and operation, and which advantageously provides a hand-held implement which has a suction cup and which has means for gaining access to a hollow handle for storing articles in the hollow handle. With the invention, a glass pane lifter apparatus is provided which employs a very simple device for releasing suction from the suction cup. With the invention, a glass pane lifter apparatus is provided which has a handle that stores a container of lock lubricant. With the invention, a glass pane lifter apparatus is provided which has a handle that stores a glass cutter. With the invention, a glass pane lifter apparatus provides a kit for accessing fire extinguishers housed in enclosures that employ glass panes locked in position with padlocks.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A glass pane lifter apparatus, comprising:
a hollow handle which includes an access opening, an elbow member that includes a first elbow end that connects to said access opening of said hollow handle, and a suction cup unit connected to said elbow member, wherein said apparatus further includes a chisel member connected to said hollow handle.

2. The apparatus of claim 1 wherein said elbow member includes a first elbow end that connects to said access opening of said hollow handle.

3. The apparatus of claim 2 wherein said access opening includes internal threads, and said first elbow end includes external threads complimentary to said internal threads of said access opening.

4. The apparatus of claim 2 wherein:

said elbow member includes a second elbow end, and said suction cup unit includes an elbow connector connected to said second elbow end and includes a suction cup connected to said elbow connector.

5. The apparatus of claim 4 wherein said second elbow end includes external threads, and said elbow connector includes internal threads complimentary to said external threads of said second elbow end.

6. The apparatus of claim 4 wherein said suction cup includes a suction release tab.

7. The apparatus of claim 1 wherein said elbow member is a right-angled elbow.

8. The apparatus of claim 1 wherein said chisel member projects from said hollow handle at an end of said hollow handle opposite to said access opening.

9. The apparatus of claim 1, further including:

a container of lubricant retainable inside said hollow handle.

10. The apparatus of claim 1, further including:

a glass cutter retainable inside said hollow handle.

11. The apparatus of claim 1 wherein said hollow handle and said elbow member are combined in a unitary handle/elbow unit.

12. The apparatus of claim 11 wherein said access opening is located on said handle/elbow unit at an end opposite to said suction cup unit.

13. The apparatus of claim 11 wherein said suction cup unit is connected to said handle/elbow unit at a threaded connection on said handle/elbow unit.

14. A glass pane lifter apparatus, comprising:

a hollow handle which includes an access opening, an elbow member that includes a first elbow end that connects to said access opening of said hollow handle, and a suction cup unit connected to said elbow member, wherein said hollow handle and said elbow member are combined in a unitary handle/elbow unit, said apparatus further including:

an absorbent pad assembly attached to said handle/elbow unit at an end opposite to said access opening.

15. The apparatus of claim 14 wherein said absorbent pad assembly includes:

a pad holder portion connected to said handle/elbow unit, and a pad retained by said pad holder portion.

16. The apparatus of claim 15 wherein:

said handle/elbow unit includes a clip-engagement flange, and said pad holder portion includes retention clips for engaging said clip-engagement flange.

17. The apparatus of claim 14, further including:

a chisel member connected to said handle/elbow unit.

18. The apparatus of claim 17 wherein said chisel member projects from said handle/elbow unit in close proximity to said access opening.

19. The apparatus of claim 18 wherein said chisel member is attached to a cap member which is screwed onto said handle/elbow unit for covering said access opening.

20. The apparatus of claim 19, further including:

a belt clip assembly attached to said cap member.

21. The apparatus of claim 20 wherein said belt clip assembly includes a manually slidable latch and a latch retention member for receiving said manually slidable latch.

22. The apparatus of claim 21 wherein said manually slidable latch operates by a spring-loaded snap action on said latch retention member.

* * * * *